June 23, 1936.   J. W. WELCH ET AL   2,044,926
REGISTERING APPARATUS
Filed Nov. 10, 1931    3 Sheets-Sheet 1
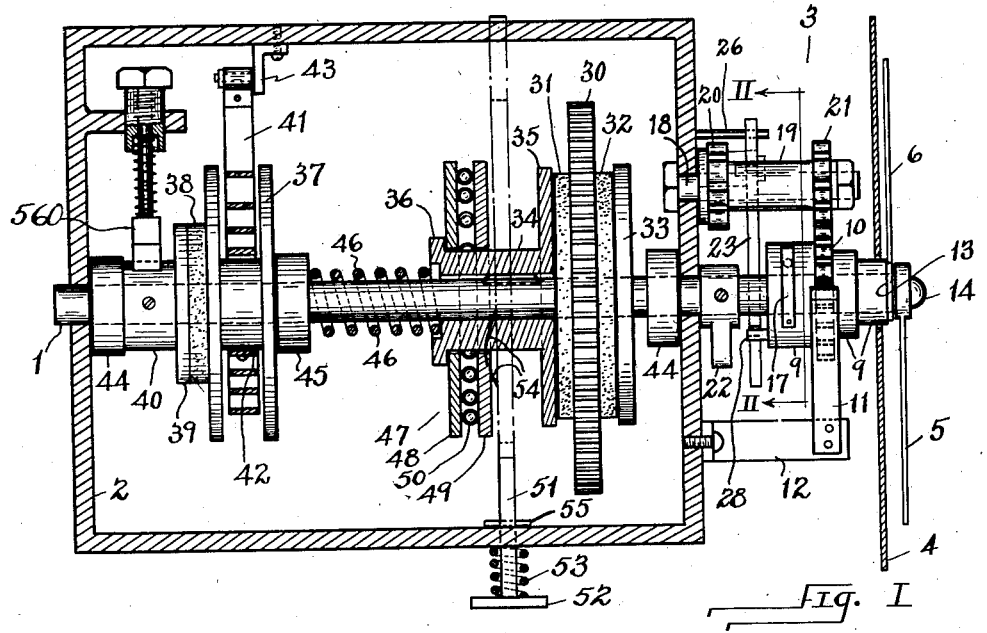
Fig. I
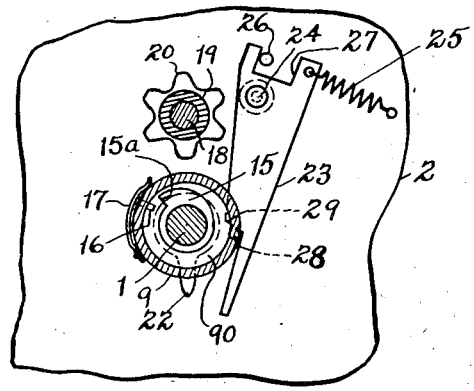
Fig. II
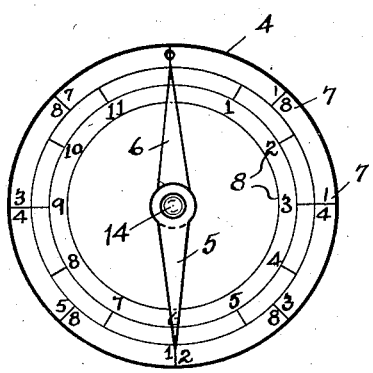
Fig. III
INVENTOR
James W. Welch and
Raymond P. Suess
by Christy, Christy & Wharton
their attorneys

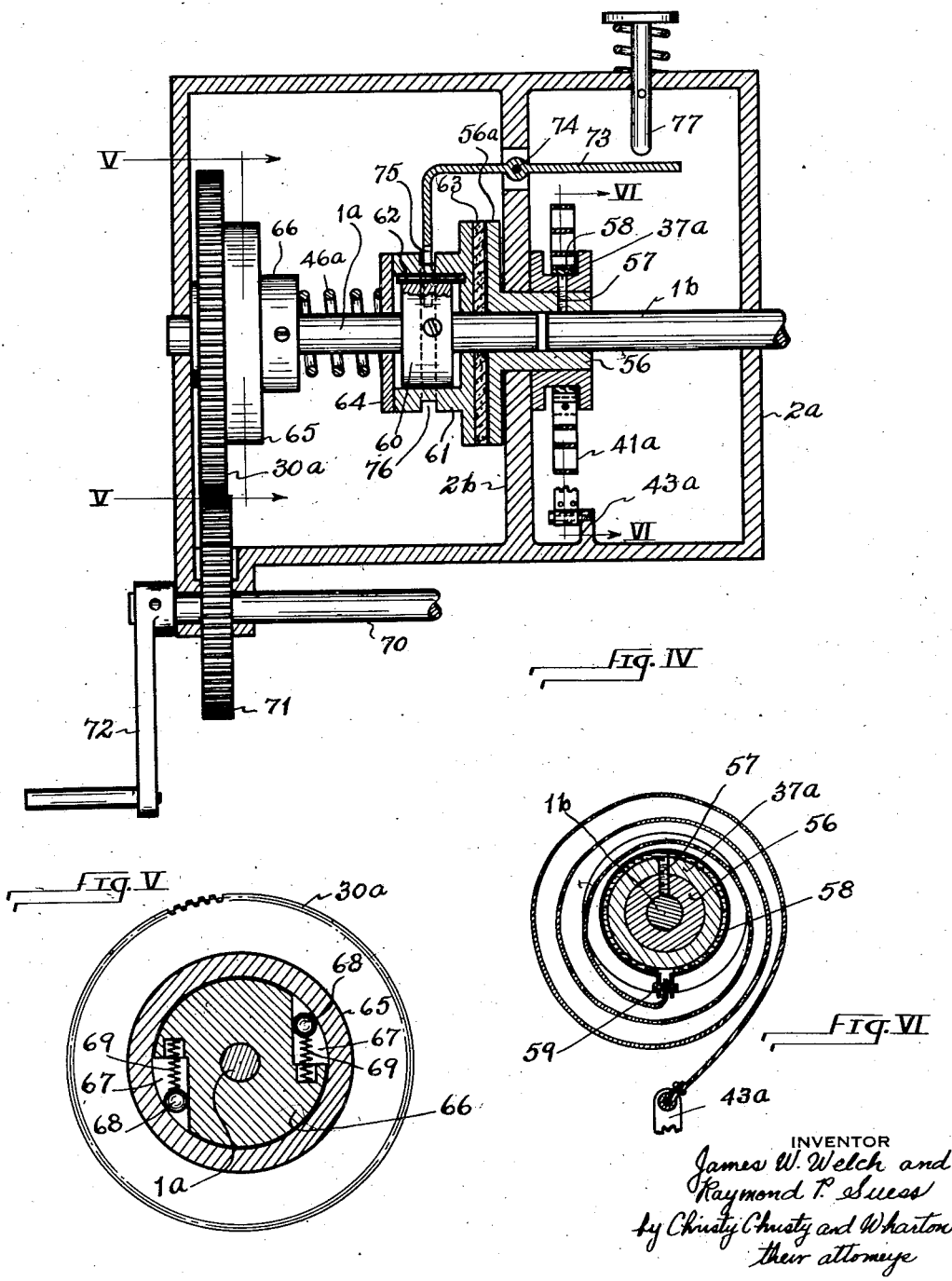

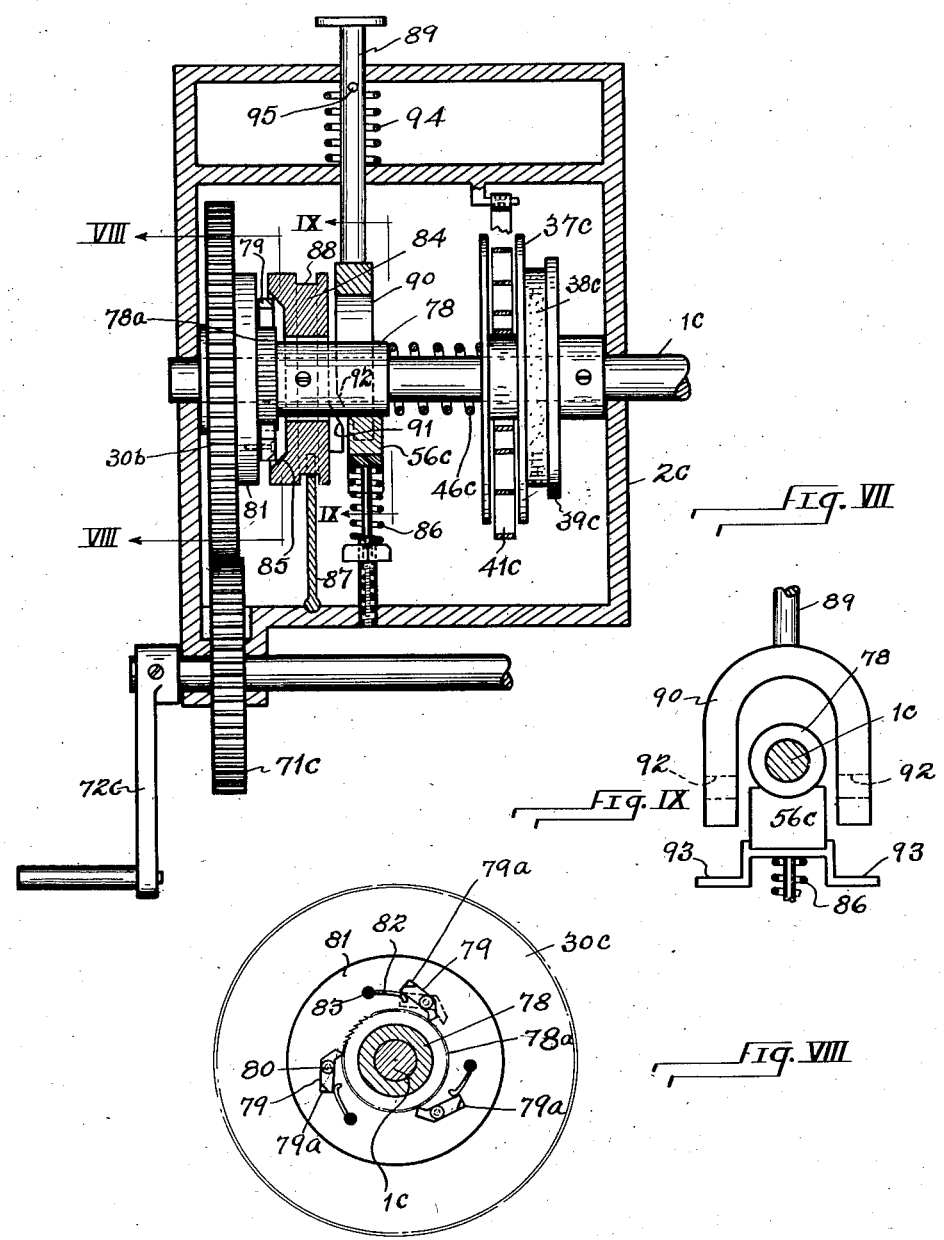

Patented June 23, 1936

2,044,926

UNITED STATES PATENT OFFICE

2,044,926

REGISTERING APPARATUS

James W. Welch, Oakland, Calif., and Raymond P. Suess, Pittsburgh, Pa., assignors of three-fifths to Bessie E. Welch, Oakland, Calif., one-fifth to Adina C. Munhall, Pittsburgh, Pa., and one-fifth to Screw Machine Specialty Company, a corporation of Delaware Application November 10, 1931, Serial No. 574,106

9 Claims. (Cl. 235—144)

Our invention relates to registering apparatus, and, while the invention will find many other uses, we have directed it particularly to equipment for dispensing grease, gasoline, and other fluids. Such equipment usually comprises metering instrumentalities for measuring the quantities of fluid delivered, and the metering instrumentalities ordinarily include a dial face provided with index hands—usually two index hands—to indicate the quantities of fluid delivered. Before the fluid-dispensing equipment is operated, the index hands of the metering instrumentalities are set at "zero", and then, as the equipment is caused to deliver the fluid, the hands turn from one indicating position to another in accordance with the quantity of fluid flowing. Ordinarily, the index hands are adapted to be manually set at their initial or "zero" position, and we have observed that many attendants either unscrupulously or accidentally fail to place the index hands at their true "zero", before they start operation of the fluid-dispensing equipment. Of course this results in the purchasers being cheated, and such cheating, whether accidental or intentional, is a thing we aim to overcome.

Such mechanical equipment as has been devised hitherto, to overcome objections of the nature indicated, has not found success, this being due to the complicated and costly nature of the equipment and/or to its inaccuracy in restoring the indicator hands from their previous metering positions to a true "zero" position.

In the accompanying drawings we have indicated registering apparatus which is adapted to be actuated by suitable connections to fluid-delivering equipment, to indicate the quantity of fluid delivered by such equipment. Fig. I is a view, partly in vertical section and partly in side elevation, of such registering instrumentalities, which instrumentalities also include, in accordance with our invention, means for restoring the index hands to a true "zero" position. Fig. II is a view in cross-section, taken on the plane II—II of Fig. I. Fig. III is a view to smaller scale, showing in front elevation the dial face and index hands of the instrument shown in Fig. I. Fig. IV is a view, comparable with Fig. I, showing a modification in the apparatus of the invention. Fig. V is a view in cross-section, taken on the plane V—V of Fig. IV. Fig. VI is a view in cross-section, taken on the plane VI—VI of Fig. IV. Fig. VII is a view, partly in vertical section and partly in side elevation, showing a still further modification in the apparatus of the invention. And Figs. VIII and IX are sectional views taken respectively on the planes VIII—VIII and IX—IX of Fig. VII.

The registering apparatus comprises a shaft 1 mounted in any suitable frame or housing 2. The shaft 1 extends from housing 2, and the extending portion of the shaft is associated with mechanism generally denoted by the numeral 3; forwardly of the mechanism 3 is a dial face 4, and upon the face 4 two index hands 5 and 6 are adapted to turn. The index hand 5 is secured to the shaft 1 so that each revolution of the shaft produces one complete revolution of the hand 5 upon the dial face. The shaft 1 is so geared to the fluid-dispensing equipment (not shown), and the dial face 4 is so calibrated that one revolution of the index 5 indicates the delivery of one unit of fluid, say the delivery of one gallon of gasoline. That is, the dial face is provided with a set of calibrations 7, by means of which the index hand 5 signifies fractional parts of the unit employed for measuring—in this case fractional parts of a gallon delivered. The index hand 6 is directly associated with the mechanism 3, and such mechanism is so particularly organized with the shaft 1 as to effect the shifting of hand 6 from one registering position to another for each complete revolution of the unit hand 5. That is to say, at the start of fluid dispensing, the hands 5, 6 are both directed to "zero" on the dial 4. Delivery of fluid is accompanied by a calibrated rotation of shaft 1 and a turning of index hand 5, the hand 6 for the while remaining at "zero." When the hand 5 has made one complete revolution, i. e., when the hand 5 has in its clockwise movement (Fig. III) returned to "zero," the mechanism 3 operates to shift the hand 6 from "zero" to a registering position "one" on the inner scale 8 of the dial face 4. So, the hand 6 will be advanced from one numeral to another on the scale 8 as the hand 5 completes each revolution. Manifestly, the two hands 5, 6 will indicate at any instant the quantity (gallons in this case) of fluid delivered. We show the scale 8 to be graduated from "zero" to "twelve," this being merely a matter of choice. If more than twelve gallons of fluid are dispensed to one purchaser, the total can be readily aggregated by watching the hands 5 and 6. There has been no difficulty experienced hitherto in this function of fluid-dispensing apparatus.

We do not claim novelty in the mechanism 3; indeed to our knowledge such mechanism has been used for some period of time. However, we shall briefly describe this mechanism, to the end that the apparatus which we associate with it will be better understood in structure and in operation.

The mechanism 3 comprises a cylindrical member 9 which is freely mounted upon shaft 1. A gear 10 is integral with the member 9, and a yielding ratchet—a leaf spring 11—is supported on a bracket 12 and bears against the gear 10, to stay it in any of its adjusted positions. The shaft 1 projects from the (right-hand) end of cylindrical member 9; the index hand 6 is freely fitted over the projecting end of shaft 1 and is secured to the end face 13 of member 9, while, as above mentioned, the hand 5 is secured to the projecting end of the shaft, conveniently by means of a screw 14.

The cylindrical member 9 is provided with a recess 90 in the region of its left-hand end, and within the recess a cam-like trip 15 is secured to shaft 1, cf. Fig. II. For reasons presently to be described, a pin 16, backed by a spring 17 secured to the face of member 9, projects through the wall of recess 90 and co-operates with trip 15. Secured to revolve on a stem 18 projecting from housing 2 is a sleeve 19, having secured at its respective ends the pinions 20 and 21. A dog or one-toothed gear 22 is secured to shaft 1, and is adapted upon one complete revolution of the shaft (1) to engage the pinion 20 and to rotate it through a fraction of a revolution, in this case the pinion being rotated through a distance equivalent to its circular pitch. The pinion 21 is in mesh with gear 10; accordingly, the step-by-step rotation of pinion 20 effected by dog 22 is imparted to gear 10, cylindrical member 9, and hand 6. The proportions of the parts are so determined that each time that the dog 22 effects an advance of pinions 20, 21, the hand 6 will be shifted from one to the next of the numerals on scale 8 of the face 4. Manifestly, each complete revolution of shaft 1 and its associated hand 5, will be followed by an advance of hand 6 through one unit on scale 8; so, the two hands 5 and 6 will be effective to aggregate the quantity of fluid delivered by the dispensing unit with which the metering apparatus is associated.

It will be understood that, when the fluid-dispensing apparatus functions, the shaft 1 is revolved clockwise, cf. Fig. II, and that, as it so revolves, the trip 15 by reason of its peculiar shape thrusts the pin 16 radially outward against the resistance of spring 17; that is, during registering rotation of shaft 1, the pin 16 and trip 15 perform no service and do not interfere with operation of the other parts, which are functioning to indicate the delivery of fluid. When delivery of fluid has ceased and the reading of the dial has been noted, it is desirable to restore both hands to "zero", and to do this the shaft 1 is rotated counter-clockwise, Fig. II. While our invention lies in means for mechanically accomplishing such return of the hands, we shall for the present direct attention only to the means in mechanism 3 which function upon the counter-clockwise rotation of the shaft 1, to effect such restoration of the hands 5, 6 to "zero".

Regardless of the position to which the index hands have been shifted, counter-clockwise rotation of shaft 1 will restore both hands (5, 6) to "zero". The hand 5, in being secured immediately to shaft 1, manifestly, will rotate counter-clockwise, toward the "zero" position. In this rotation of shaft 1, the trip 15 will not thrust the pin 16 aside in the manner it does during a clockwise, registering rotation, but will engage the pin and in effect will unite the cylindrical member 9 with the shaft, whereby the member 9 and the shaft will revolve counter-clockwise in unison, thus shifting both hands 5, 6 toward their common initial or "zero" position. That is to say, regardless of the position of the parts, counter-clockwise movement of shaft 1 will sooner or later, depending upon whether the hand 6 is nearer or further from its origin, move the trip 15 to such position that its shoulder 15a will abut pin 16, so as to join the cylindrical member 9 with the shaft 1 for united counter-clockwise rotation. The pin 16 is so located in member 9 and the trip 15 is so positioned on shaft 1 that, when the above-stated union between member 9 and the shaft is effected, the two hands 5 and 6 will extend in alignment and will turn in such mutual relation to their common origin on the dial 4. In order to prevent the hands 5, 6 (in their counter-clockwise movement) from shifting past the "zero" position, a pawl 23 is provided; the pawl is pivotally secured at 24 to the housing 2; a spring 25 is so organized as to exert a force tending to swing the pawl clockwise, and a stop 26 extends from the housing or frame 2 into a notch 27 in the pawl, whereby movement of the pawl is limited in either direction of rotation about the pivot 24. A pin 28 projects from cylindrical member 9 (Figs. I and II), and the pawl 23 is provided with a shoulder 29 which lies in the path followed by the pin when the cylindrical member 9 and its associated hand 6 are rotated. Upon clockwise rotation of the shaft 1 and member 9, obviously, the pin 28 will brush the pawl aside (against resistance of spring 25), but upon counter-clockwise rotation of the parts, to restore the hands to "zero", the pin 28 will strike the shoulder 29 and positively stop all motion, causing the hands 5 and 6 to stop at their initial position, ready for an ensuing registering operation.

We shall now proceed to the machinery which is associated with shaft 1, to effect a mechanical restoration of the hands 5, 6 from any registering position to their initial or "zero" position. It may be repeated that such machinery is adapted, once it has been set in motion, to restore both hands 5 and 6 to their absolute "zero", and that the machinery does not permit the index hands to be restored part-way to their "zero" position in such manner that fraud can be practiced by unscrupulous attendants.

Referring to Fig. I machinery of this nature is indicated. Upon shaft 1 a gear 30 is freely mounted; the gear is provided on its sides with facings 31 and 32 of cork or other frictional material; a collar 33 is secured to shaft 1 and normally abuts the frictional facing 32. To the left of the gear 30, we position a tubular sleeve 34, provided with two collars 35 and 36. The sleeve is splined to the shaft 1 and may move longitudinally thereon within certain limits. A spool 37 is freely mounted on the shaft; it is provided with a frictional facing 38, abutting the collar 39 of a sleeve 40 which is fixed to the shaft. A spiral spring 41 is secured at its central end 42 to the spool 37, and at its outer end is secured to a fixture 43.

Adjacent each end wall of the housing 2, a thrust bearing 44 is secured to shaft 1, and freely slidable on the shaft is an intermediate thrust bearing 45. A compression spring 46 surrounds shaft 1 and is located between slidable bearing 45 and sleeve member 34, exerting forces tending to separate the member 34 and the bearing 45, which in turn maintains the spool 37, by means of its facing 38, in frictional engagement with collar 39, and frictionally maintains the gear 30 united to shaft 1; that is, the facings 31, 32 of the gear are pressed by collars 33 and 35, respectively, and these collars in being secured against rotation to the shaft 1 effect a frictional union between the gear and the shaft. Such is the normal relation and association of the parts.

By means of suitable gearing (not shown) the gear 30 is connected to rotate with calibrated movement, when the fluid-dispensing equipment, with which metering apparatus is associated, is operated. That is to say, when fluid is delivered, the gear 30 is revolved with a velocity proportional to the fluid delivered. The shaft 1 in being frictionally united with gear 30, as mentioned, rotates with the gear and shifts the index hands to indicate the quantity of fluid delivered. While the shaft 1 so rotates to shift the hands 5, 6, the spool 37 revolves, winding the spiral spring 41 upon itself. Thus energy is stored in the spring—an energy which is opposed to the clockwise, registering rotation of the shaft 1. This action of the parts continues, upon continued delivery of fluid, until the forces stored in spring 41 are equal to the friction between the facing 38 and collar 39; thereafter the spool 37 remains idle, the frictional union between the parts 38, 39 failing to the extent that the spring 41 is wound no tighter. Slippage occurs between collar 39 and facing 38, and, while such slippage permits continued registering rotation of the shaft 1 after the spring has been sufficiently charged with energy, it will be understood that the charge placed in the spring is retained, until intentionally released. It will be further understood that the frictional union of the gear 30 to shaft 1 is much greater than that of the spool 37, so that there is no slippage of the gear, all clockwise rotation of the gear being transmitted to the shaft 1.

When the fluid-metering operation is at an end, and it becomes desirable to restore the hands 5, 6 to their "zero" position, the shaft 1 is released to the forces of spring 41, which spring due to the potential forces stored therein effects a rapid counter-clockwise rotation of the shaft, and restores the hands to "zero" in the manner above described. The means for releasing the shaft to the forces of the spring include a collar 47 upon sleeve 34. Advantageously, the collar 47 comprises two annuli 48, 49 between which a race 50 of antifriction bearings is located. Means are associated with the collar 47, to effect a shifting of it from right to left, Fig. I. Such shifting of collar 47 effects a like shifting of sleeve 34, compressing spring 46, and destroying the frictional union of the gear 30 with the shaft 1. So, the frictional union, effected by the collars and facings 35, 31 and 33, 32 respectively, in being destroyed frees the shaft to the forces of spring 41, it being noted that the compression of spring 46 increases the frictional union between collar 39 and spool 37. Accordingly, the spool 37 is more securely united with shaft 1 when the spring 41 is freed, to rotate the shaft counter-clockwise and to restore the index hands to "zero".

While any convenient means may be organized with collar 47 to effect its right-to-left shifting, I have shown a throwing arm 51 extending transversely of the housing 2. The throwing arm is provided with a head 52, and a spring 53 is adapted normally to maintain the head outwardly of the housing 2. The throwing arm 51 has one or more cam lugs (see lines 54) on its face, and, upon thrusting the head 52 inwardly against the resistance of spring 53, the cam lug 54 strikes against the right-hand face of collar 47 (in this case against the face of annulus 49) and "wedges" the collar and its associated parts to the left, effecting a restoration of the hands 5, 6 to "zero", as described above. Pressure being removed from the head 52, the spring 53 restores the throwing arm to its normal position, where a pin 55 in the arm lies against the wall of housing 2, serving as a stop to confine the arm (51) within a definite range of movement.

It may be remarked that the action of the apparatus is so rapid that it is impossible for an attendant, by gently tapping the head 52, to effect such an instantaneous release of shaft 1 to the forces of spring 41, that the hands will be restored only part way to their origin. When an unscrupulous attendant so endeavors to falsify the index hands (by tapping the head 52) either there will be no response (the taps being insufficient to effect compression of spring 46) or the taps, being sufficiently strong, will effect a compression of spring 46 which instantaneously is followed by a reverse rotation of shaft 1 and a restoration of the hands 5, 6 to "zero". Indeed the action of the parts is so quick that we have applied an adjustable brake shoe 560 to the sleeve 40, to lessen the violence accompanying the movement of the parts. The brake 560 additionally serves to impart a more constant resistance to clockwise movement of the shaft, as is desirable during the registering rotation of the shaft 1.

A modification of the invention is illustrated in Figs. IV to VI of the drawings. In this modified structure the main shaft of the apparatus is divided, comprising two sections 1a and 1b, suitably trunnioned in housing 2a. The shaft section 1b projects from the housing 2a and is associated with a dial face, index hands, and mechanism, such for example as the face 4, hands 5, 6, and mechanism 3, shown in Fig. I. The housing 2a includes a support 2b, in which there is revolubly secured a sleeve 56. As appears in Fig. IV, the sleeve 56 projects from the support and has mounted thereon a spool 37a, with which a spiral spring 41a is associated. The inner ends of shaft portions 1a and 1b are located within sleeve 56, and a set-screw 57 serves as means for positively uniting the spool 37a and sleeve 56 to shaft portion 1b.

At its outer end the spring 41a is secured to a stationary fixture 43a, and the inner end of the spring is secured to a so-called brake-band 58. That is to say, the inner end of spring 41a is not positively fixed to the spool 37a; a frictional band 58 is drawn to desired tautness about the spool body, and the inner end of the spring is secured at 59 to such band, cf. Fig. VI. Accordingly, the energy stored in the spring (by rotation of the spool) is limited; that is, when the spring has been wound to such degree that its forces equal and oppose the friction between the band 58 and the spool, the spool will slip within the band. An adjustable screw at 59 secures the two ends of the brake-band 58, so that the friction between the spool and the band may be regulated, and the forces stored in the spring determined to suit the needs.

On the left of support 2b (Fig. IV) the sleeve 56 terminates in a collar 56a. Upon shaft portion 1a a collar 60 is secured; upon this collar a cylindrical member 61 is splined by means of a cylindrical key 62; on its right-hand end the member 61 is provided with a frictional facing 63, adapted to bear against the collar 56a, which manifestly is rigidly secured to shaft portion 1b. On its left the member 61 is faced by a washer 64, against which a compression spring 46a bears. One element 66 of a ratchet device—advantageously it is a ball or roller ratchet—is secured to shaft portion 1a, and between this element and the washer 64 the spring 46a is compressed. The spring 46a tends to maintain the parts in such position that the cylindrical member 61 is united frictionally with the collar 56a and its sleeve 56. Under these conditions rotation of shaft 1a will be transmitted to shaft 1b.

A gear 30a, including a ratchet drum 65 is freely mounted on shaft 1a, and, as is illustrated in detail in Fig. V, the ratchet element 66 is recessed, to provide the regions 67 in which balls or rollers 68 are backed by springs 69. The recesses or regions 67 are so formed in the ratchet element 66, and the balls or rollers 68 (either balls or rollers may be employed) are so directed by the springs 69 into contact with the inner cylindrical face of the drum 65, that the balls or rollers tend to wedge between the walls of the recesses 67 and the inner face of the drum. The effect of the organization is such that the balls 68 unite the shaft 1a with the gear 30a, when the gear is rotated counter-clockwise, Fig. V. It will be understood that counter-clockwise rotation in Fig. V, because of the point of view from which Fig. V is taken, is the same as the clockwise or registering rotation referred to in the description of Figs. I–III. Of course, rotation of the gear 30a in an opposite direction will not disturb the ratchet element 66 and the shaft 1a, because manifestly the balls will not wedge in the manner above mentioned. Accordingly, when the gear is connected to the fluid-dispensing equipment, either a step-by-step operation of the equipment or a continuous operation thereof will impart only a registering rotation to the shafts 1a, 1b. For example, if the fluid dispensing apparatus is adapted to be operated by a shaft 70, and such shaft is connected as it might well be, by means of a pinion 71, to the gear 30a, the shaft-operating handle 72 can be either oscillated through a fraction of a revolution, or continuously moved through complete revolutions, without effecting the accuracy of the registering apparatus. We mention this because we have found that some fluid pumps are operated by oscillating the pump handle, rather than by rotating it. So it will be understood that actuation of the fluid-dispensing equipment will effect a registering rotation of shafts 1a, 1b, and a winding of spring 41a.

The spring will wind and store energy in itself until it reaches such condition that the forces tending to unwind it are equal to the friction between the band 58 and the spool 37a. Continued registering rotation of the parts will be accompanied by slippage between the band 58 and the spool 37a, and such slippage will prevent further storage of energy in the spring, but will not admit of the escape of the energy previously stored therein. The parts behave in this manner until the fluid-dispensing operation is finished and the register reading noted—then the index hands (5, 6) must be restored to "zero", preparatory to a succeeding delivery of fluid.

To restore the index hands to "zero" the shaft 1b is released to the forces of spring 41a, comparable with the manner in which the shaft 1 is released to spring 41. To accomplish this we shift the cylindrical member 61 from right to left (Fig. IV), compressing spring 46a and breaking the frictional engagement between the member 61 and the collar 56a. Accordingly, the shaft 1b is freed to the influence of spiral spring 41a which is effective to rotate the shaft reversely and to restore the index hands (5, 6) to "zero". Advantageously, the means for effecting the right-to-left shifting of the member 61 comprise a lever 73, pin connected at 74 to the supoprt 2b, and bifurcated at 75 to fit a groove 76 in member 61. A spring backed rod 77 is arranged as indicated in Fig. IV of the drawings, and, manifestly, by depressing the rod 77, the lever 73 will swing in such manner as to effect the desired shifting of the member 61, to release shaft 1b to the spring 41a. If in certain instances it is found expedient, a brake (such as the brake 56a, Fig. I) may be organized with the cylindrical face of drum 65.

A still further modification of the apparatus is shown in Figs. VII to IX inclusive, in which modification the shaft 1c is mounted in housing 2c, and is organized with index mechanism and dial hands, as the shaft 1 in the first-described apparatus is organized with the mechanism 3 and the hands 5, 6. A gear 30b is freely mounted on shaft 1c and meshes with a pinion 71c, or other convenient gearing which moves in accordance with the dispensing operation of associated fluid-dispensing equipment. Secured to the shaft 1c is a sleeve 78, carrying integrally therewith a ratchet wheel 78a. One or more pawls 79 are pivotally connected (say by pins 80) to the end face of a drum 81 which is integral with or secured to the gear 30b. Each pawl 79 has an associated spring 82 secured to the drum 81 at 83; the spring so influences the pawl as to press its working edge into engagement with the ratchet wheel 78a. Upon reference to Fig. VIII it will be perceived that clockwise or registering rotation of the gear 30b will be transmitted to the shaft 1c, and that a counter-clockwise turning of the gear, accompanying an oscillatory actuation of handle 72c, will not be imparted to the shaft 1c, the pawls yielding and slipping over the ratchet wheel in known manner.

As in the apparatus shown in Fig. I, there is a spool 37c, having a frictional facing 38c, freely mounted on shaft 1c, and for reasons similar to those expressed in describing the apparatus of Fig. I, a spiral spring 41c is associated with the spool. A collar 39c is secured to the shaft, and the frictional engagement between the collar and the facing 38c normally unites the shaft and spool. A compression spring 46c is located on the shaft as shown, tending to maintain the spool and collar frictionally united.

Upon a registering rotation of the shaft 1c, the spring 41c is stored with energy, up to the point, as hereinbefore described, where the spring force equals the friction between the facing 38c and collar 39c. Registering being completed, the shaft is then released to the stored energy of the spring which effects a counter rotation of the shaft and the restoration of the index hands (5, 6) to their origin. To so release the shaft 1c to the spring 41c, we shift the pawls 79 out of engagement with the ratchet wheel 78a, and this we accomplish by means of a releasing block 84. The releasing block is provided with an inner, annular, tapering face 85, and the pawls 79 are provided with correspondingly tapered corners 79a at their outer ends, whereby, when the releasing block is moved to the left (Fig. VII), the tapering face 85 bears upon the corners 79a and effects a swinging of the pawls, upon their pins 80, out of engagement with the ratchet wheel 78a.

To the end that the pawls will not be so tightly lodged in the ratchet wheel as to prevent such release, we provide a brake 56c, which, by means of an adjustably backed spring 86, is urged into contact with the sleeve 78. In order that the brake 56c will not impede the action of the spring 41c in restoring the index hands to their origin, we provide means for releasing the brake when the pawls have been shifted out of engagement with the ratchet wheel 78a. Advantageously such means are also adapted to shift the releasing block 84. The releasing block is supported upon a tiltable plate 87, fitting at its upper end into a groove 88 in the block; such support of the block is effected to prevent the block from resting upon the sleeve 78 and constituting a drag on the moving parts.

The means for releasing the brake and shifting the releasing block comprise a rod 89, carrying a yoke 90 which depends on opposite sides of the sleeve 78, as shown in Fig. IX. The releasing block is provided with two wedge-shaped lugs 91, to cooperate with each leg of the yoke 90; that is to say, each leg of the yoke is provided with a tapering shoulder 92, and, when the rod and yoke are forced downward, the tapering shoulders strike the lugs 91 on the releasing block, and effect a thrusting of the block to the left (Fig. VII), whereby the pawls are shifted away from the ratchet wheel 78a. The brake 56c is a stronger brake than those described above; it is adapted to hold the shaft 1c against movement, during the non-dispensing stroke of the crank 72c and the brake as well as the pawls, must be released, to permit the spring 41c to do its work. Accordingly, the brake is provided with shoulder elements 93 (Fig. IX), and the bottoms of the legs of the yoke are adapted, during their descent, to strike these shoulders and to force the brake 56c downward against the resistance of spring 86 and out of braking engagement with sleeve 78. Moreover, the dimensions of the parts are so determined that, upon depression of the rod 89, the releasing block 84 is thrust aside and the pawls 79 opened, before the brake is released. Accordingly, when the brake is released, the shaft 1c will be instantaneously given up to the forces of the spring 41c, and the index hands (5, 6) will be restored to zero. In this modification of the apparatus as in the others, the operation is certain and insured against the tampering of unscrupulous attendants. A compression spring 94 surrounds the rod 89, and bears against a pin 95 in the rod; this last-mentioned spring is effective to restore the rod 89 and yoke 90 to their normal, illustrated positions, and to maintain them there, ready for intentional depression, to effect restoration of the index hands to their origin.

In the following claims when we say that the rotation of the parts is clockwise, we intend that the rotation is such as to produce a registering operation of the apparatus, and by counterclockwise we mean that the rotation is opposite to registering rotation. In this manner we seek to avoid so far as possible involved expression of the invention.

We claim as our invention:

1. In registering apparatus including a calibrated face, an index, a gear, and a shaft in response to whose rotation in either direction said index correspondingly turns, the combination of means connecting said shaft with said gear during continuous rotation of the gear in one direction or oscillatory rotation in opposite directions for rotating said shaft clockwise, said connections comprising a ratchet and pawl, energy-storing means adapted to be energized by clockwise rotation of said shaft and when energized tending to rotate said shaft counterclockwise, frictional connections between said energy-storing means and said shaft, whereby the quantity of energy stored in said means lies within a limited value regardless of the number of clockwise rotations of said shaft, and means for releasing said shaft to the influence of said energy-storing means.

2. In registering apparatus including a calibrated face, an index, a gear, and a shaft in response to whose rotation in either direction said index correspondingly turns, the combination of a ratchet and pawl device for connecting said gear with said shaft for clockwise rotation, means effective during such clockwise rotation of said shaft for storing energy tending to produce counterclockwise rotation of the shaft, and frictional connections between said shaft and said energy-storing means for holding the storage of energy within a limited value regardless of the number of clockwise rotations of the shaft, and means for shifting said pawl from engagement with said ratchet, whereby said shaft is released to the influence of said energy-storing means.

3. The structure of claim 2, in which said pawl includes a tapered face, and said pawl-shifting means comprises a member movable axially of said shaft and into sliding engagement with the tapered face of said pawl.

4. In registering apparatus having indicating means including a dial face and an index, a drive shaft for operating said indicating means, and means for rotating said shaft, the combination of a device for connecting said last-mentioned means with said shaft, said device including a ratchet-wheel and a pawl normally engaging said ratchet-wheel, and means movable axially of said ratchet-wheel for moving said pawl from engagement with the ratchet-wheel.

5. In registering apparatus having indicating means including a dial face and an index, a drive shaft for operating said indicating means, and means for rotating said shaft, the combination of a device for connecting said last-mentioned means with said shaft, said device including a ratchet-wheel and a plurality of pawls normally engaging said ratchet-wheel at spaced-apart points peripherally thereof, and a member including an annular chamfered face movable laterally of the pawls for moving said pawls from engagement with said ratchet-wheel.

6. In registering apparatus having indicating means including a dial face and an index, a drive shaft for operating said indicating means, and means for rotating said shaft, the combination of a device for connecting said last-mentioned means with said shaft, said device including a ratchet-wheel and a plurality of pawls normally engaging said ratchet-wheel at spaced-apart points peripherally thereof, and a member including an annular chamfered face movable axially of said ratchet-wheel for moving said pawls from engagement therewith.

7. In registering apparatus having indicating means including a dial face and an index, a shaft connected to said means, and means for rotating said shaft clockwise to effect registering operation of said indicating means, the combination of means for connecting said last-mentioned means with said shaft, said connecting means including a ratchet-wheel and a pawl normally engaging the ratchet-wheel, means effective during clockwise rotation of said shaft for storing energy tending to effect counterclockwise rotation of the shaft, and means for moving said pawl from engagement with said ratchet-wheel, whereby said shaft may rotate counterclockwise under the influence of said energy-storing means and restore said indicating means from a registering position to an initial position.

8. In registering apparatus having indicating means including a dial face and an index, a shaft connected to said means, means for rotating said shaft clockwise to effect registering operation of said indicating means, the combination of means for connecting said last-mentioned means with said shaft, said connecting means including a ratchet-wheel and a plurality of pawls normally engaging said ratchet-wheel at spaced-apart points peripherally thereof, means effective during clockwise rotation of said shaft for storing energy tending to rotate said shaft counterclockwise, and means movable relatively to said ratchet-wheel for moving the pawls from engagement therewith, whereby said shaft may rotate counterclockwise under the influence of said energy-storing means and restore said indicating means from a registering position to an initial position.

9. In registering apparatus having indicating means including a dial face and an index, a shaft connected to said means, and means for rotating said shaft clockwise to effect registering operation of said indicating means, the combination of means for connecting said last-mentioned means with said shaft, said connecting means including a ratchet-wheel and a plurality of pawls normally engaging said ratchet-wheel at spaced-apart points peripherally thereof, means effective during clockwise rotation of said shaft for storing energy tending to rotate said shaft counterclockwise, and a member including an annular chamfered face movable relatively to said ratchet-wheel for moving said pawls from engagement therewith, whereby said shaft may rotate counterclockwise under the influence of said energy-storing means and restore said indicating means from a registering position to an initial position.

JAMES W. WELCH.
RAYMOND P. SUESS.